United States Patent [19]
Simpson

[11] Patent Number: 4,769,943
[45] Date of Patent: Sep. 13, 1988

[54] INSECT REPELLENT CUFFS FOR MARINE MOORING LINES

[76] Inventor: Hugh M. Simpson, 122 Eagle Dr., Daphne, Ala. 36526

[21] Appl. No.: 764,799

[22] Filed: Aug. 9, 1985

[51] Int. Cl.[4] ............................................. A01M 25/00
[52] U.S. Cl. ........................................ 43/107; 43/124
[58] Field of Search .................. 43/107, 108, 121, 124, 43/115, 116, 58, 65; 114/221 R

[56] References Cited
U.S. PATENT DOCUMENTS

| | | | |
|---|---|---|---|
| 274,284 | 3/1883 | Curtiss | 43/107 |
| 351,424 | 10/1886 | Childs | 43/124 |
| 916,106 | 3/1909 | Clark | 43/108 |
| 1,060,993 | 5/1913 | Maynard | 43/124 |
| 1,814,471 | 7/1931 | Gove | 43/124 |
| 2,143,043 | 1/1939 | Wexler | 43/108 |
| 2,315,772 | 4/1943 | Closs | 43/121 |
| 3,295,246 | 1/1967 | Landsman et al. | 43/131 |

FOREIGN PATENT DOCUMENTS
62503 4/1984 Japan ........................................ 43/107

*Primary Examiner*—M. Jordan
*Attorney, Agent, or Firm*—C. Emmett Pugh

[57] ABSTRACT

A plastic cuff which has been sectioned and cut to fit a mooring line for a marine vessel and similarly shaped structures. The cuff may be tubular or cylindrical and provided with a spiral cut. It is treated with an insecticidal agent or made of an insecticidal material. If cylindrical, it is made with sufficient elasticity to maintain its shape, so that the cylindrical cuff may be wrapped around a rope or other extended cylindrical shape by means of opening the cuff along the spiral cut which travels the length of the cuff. It then clings to the rope due to the inherent tension of elastically attempting to resume its original shape. Alternatively, the cuff may be attached or retained by way of clasps on either end or by pins.

10 Claims, 1 Drawing Sheet

INSECT REPELLENT CUFFS FOR MARINE MOORING LINES

BACKGROUND OF INVENTION

1. Field of Invention

The present invention relates to pest control in a marine environment. More particularly, the invention relates to pesticidal strips, and more particularly to the use of such pesticidal strips for control of insects on marine mooring lines. Still more particulaly, the present invention relates to an encircling cuff and method for producing the same for the purpose of protecting mooring lines of boats and similar shaped structures.

2. Prior Art and General Background

Several guard-type devices exist for control of large animals or rodents from moving along mooring lines, cables or similar structures from land or other mooring point to a marine vessel. However, these radially extended, mechanical guards or barriers are largely ineffective against small insects and may also be circumvented by the animals which they are designed to keep off. Examples of these are U.S. Pat. No. 2,483,874 issued Oct. 4, 1949 to T. J. Bernard and U.S. Pat. No. 2,617,378 issued Nov. 11, 1952 to J. Osol.

In a separate art area, flea repellent collars for the protection of animals have been developed, wherein for example a plasticized resin compound impregnated with a pesticide is used in order to protect dogs, cats and other animals from insect-like pests, such as for example fleas. Examples of these are U.S. Pat. No. 3,852,416 issued Dec. 3, 1974 to Larry M. Grubb et al and U.S. Pat. No. 2,734,483 issued Feb. 14, 1956 to Howard J. Peo. These patents limit their design with a single buckle, half of the buckle being attached to each end of the collar. They are further limited to being a single wrapping of limited width, limited by the size of the intended animal's neck.

3. General Discussion of the Invention

A particular problem with ships has been keeping off insects and other vermin. The usual floating separation of a ship from land provides a certain natural protection against unwanted pests, but the attachments which the ship has to the land in the form of mooring lines and gangways provide unwanted access for various pests. This invention relates to a insect repellent cuff or helical coil, which is designed to provide a chemical pesticide repellent barrier along these pathways, which may be inexpensively produced and easily replaced.

The invention has a more particular purpose of providing an insect repelling surface which may be easily attached to mooring lines, easily replaced, is of self-ajusting character and self-adhering.

The method for producing the invention is also set forth which is designed to inexpensively and quickly produce the cuffs as set forth herein.

In one form, the invention is completely self attaching by way of stretching the elastic material along the mooring lines. The cuff is in a cylindrical form with a spiral cut along the cylinder walls traveling from one end to the other end, so that the expanded cuff has a shape of a helix coil which may be wrapped around the mooring line.

Once in place, when the expanding tension is removed from the helical coil or cuff, the elasticity in the material from which it is made resumes the unexpanded cylindrical shape to the extent allowed by the underlying rope or mooring line. In this way the cuff firmly grips and attaches itself to the rope and is held firmly in place in a proper shape to serve as an effective pest barrier.

If desired, one or more attaching clips or buckles may be used in order to hold one or both ends of the cuff in a certain place along the rope.

An alternative mode of the invention would be to have a non-helical or non-cylindrical cuff with appropriate clasps on either end, so that it can be wrapped around the member to be protected and then clasped on either end. This method is not as preferred, since gaps would be present unless the invention was carefully applied. The invention also requires a certain axial length or width for the cylindrical shape of the cuff, which width can more precisely be met by having the length along the axis predetermined.

Another alternative mode would be to have a clasp or securing mechanism or glue along one end of a sheet of repellent material. The sheet could then be applied along the mooring line by wrapping and subsequently fixed in place by way of the clasp, securing mechanism or glue. The size of the sheet would meet the size of the axial length of the corresponding cuff described above, so that the cylinder formed by wrapping the sheet would have the same axial length as the cuff. The sheet of material could be made of appropriately elastic material, so that the sheet would naturally tend to take the same cylindrical form the coil or cuff assumes.

The use of clasps generally, and specifically clasps made of non-yeilding material, generally are discouraged, as these might damage the mooring lines.

The cuff, sheet or band once manufactured and before being given the spiral cut could be treated with various insect and animal repellents, some examples of which are set forth in U.S. Pat. No. 3,852,416 issued Dec. 3, 1974 to Larry M. Grub et al. The particular repellents used would depend on the type of vermin sought to be removed, and the desired lifetime of the band. With certain vermin, the use of some edible coating, or an entirely edible elastic or non-elastic material and poison might be used in order to poison or otherwise incapacitate the unwanted pest.

The principal object of this invention is to protect marine vessels (ships, boats, etc.) from insects by putting up a repellent barrier along the mooring lines and gangways connecting the vessel to a mooring point, such as for example a warf or other land area.

A further object of the invention is to provide a method for obtaining the principle object with a device which is easy to apply or remove and inexpensive to manufacture.

A further object of the invention is to provide a method for protecting marine vessels from insects transversing the mooring lines in a manner which would not tend to damage the lines.

A further object of the invention is to provide a method of protecting marine vessels from insects by putting up a repellent or poisonous strip or barrier of material along the path of entry of the insects or rodents.

However, it is noted that, although the most preferred embodiment of the invention is for the protection of ship mooring lines, the invention may be used for protecting similar extended stuctures, such as for example tree trunks, building foundations, etc.; as will be seen from the description of the invention and its methods of use described in detail below.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein.

DETAILED DESCRIPTION of the PREFERRED EXEMPLARY EMBODIMENTS

Figure 1:
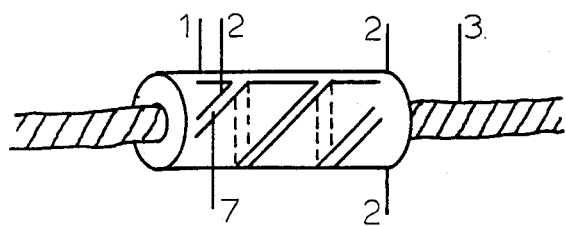
FIG. 1 is a perspective view of an insect repellent cuff or guard made in accordance with the invention and attached to a mooring line (shown in partial view).

As can best be seen by reference to FIG. 1, the preferred embodiment of the repellent cuff 1 of the present invention in place on a mooring line or rope 3 coils around the rope 3 several times for a desired length around the rope. For most insects this length has been found to be sufficient if it is approximately two inches. For other pests such as rats and mice, the length is extended in order to provide a more sufficient repellent distance that the animal or rodent cannot jump over or cross.

The cuff 1 with spiral cuts 2 covers a portion of the mooring line 3 more or less completely or with small spaces 7 where the spirals are not fully together.

Figure 2:
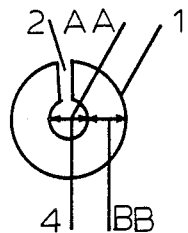
FIG. 2 is a cross-sectional, end view taken along section lines 2—2 of FIG. 1.

As can best be seen by FIG. 2 rope or mooring line 3 extends through the opening 4 and cuff 1. The cuff 1 may be expanded due to the presence of the spiral cut 2 in order to pass a rope of diameter greater than the opening 4. The diameter AA of the cuff 1 in the preferred embodiment is slightly less than the diameter of the mooring line 3, so that when the expanding force is removed from the cuff 1, the elastic nature of the cuff 1 causes the cuff 1 to attempt to revert back to the reduced diameter AA, which firmly attaches the cuff to mooring line 3. Diameter BB between the inner surface of the cuff and the outer surface of the cuff may be expanded in order to provide additional protection, although for insects a sufficient width has been found to be of the order of about three-eighths of an inch. For a mooring line for a typical small boat, an inner diameter AA of approximately three-eighths inch has been found to be adequate for most ropes. For boats of over sixty feet in length, where larger mooring lines are used, a comparably expanded inner diameter and larger, natural size cuff are used.

Although a spiral cut is not absolutely necessary, a spiral cut is normally preferred, since this would insure greater coverage of the mooring line than a cut which did not spiral and coincidently would leave a direct path along the line where the cuff would not need to be crossed.

Similarly, a cut is not required, and the cuff could merely be slid over the rope. However, this is generally less desireable, as it would either require a cut be given to the cuff before applying the cuff, or the cuff would have to be slid onto the end of the mooring line or the cuff would have to be applied or molded at the desired place on the mooring line.

Figure 3:
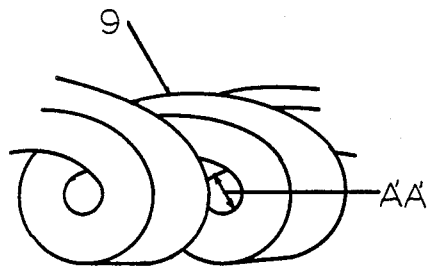
FIG. 3 is an expanded view of the guard shown in FIG. 1 but with the rope removed.

As can best be seen by FIG. 3 the diameter AA is extended to diameter A'—A' in order to place the cuff 1 around rope 3.

Cuff 1 may be made of several different materials, including any material which can be used for the retention of insecticides and which has sufficient elasticity. An ideal material is a poly-vinyl cuff, such as that used in any poly-vinyl tubing. Additionally, a non-elastic material may be used, which is more receptive to holding a distant pesticide material or in order to add extra width to distance BB, and this may be attached separately to an elastic material.

It should be noted that for most lines a cylindrical shape for the cuff would be desired. However, the invention is not limited to any particular shape, as long as the cuff defines an opening or can be made to define an opening corresponding to the rope.

Figure 4:
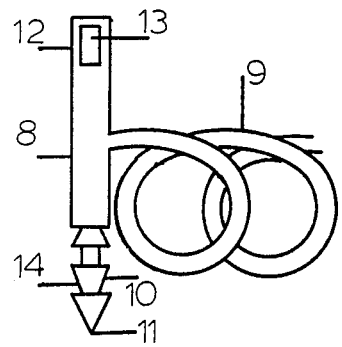
FIG. 4 is a perspective view of a modification of the invention shown in FIG. 1, wherein attaching clips have been added to either side in order to hold the guard in place.

FIG. 4 shows a modification of the invention wherein buckles 8 are provides on either end of the spiral or helix 9. These buckles 8 serve to further fix the cuff 1 in place and could also be used in the event that elastic cuffs 1 were not desired.

In one embodiment, these buckles 8 could be made in the same mold with the cuff 1 and be integrally connected therewith. The buckle 8 in this form could be made with serrated edges 10 with a flat point coming to a point 11 and then expanding at the base 14 again on one end, with the other end of said buckle 12 defining an opening 13 slightly smaller than the base end 14 of said buckle, so that once the base 14 has moved though the opening 13 through compression of the larger base 14, it will be held in place by the expanded base 14. With an elastic cuff 1, one buckle 8 would be all that is necessary to hold the cuff 1 in place.

Pins could be used in place of the buckles 8 in order to hold the material in place. The pins could be inserted through holes placed in the cuff for this purpose and then inserted into and through the mooring line 3 to be protected.

Figure 5:
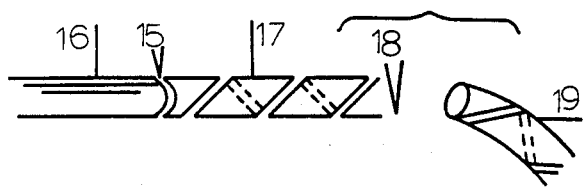
FIG. 5 is a diagramatical illustration of the procedure for producing coated helical coils for use with this invention.

FIG. 5 generally illustrates the method for producing the invention. The cylindrical cuff, which has either been treated or which is to be treated, passes through a spiral slicer 15 at a constant speed where the slicer moves around the material of the vinyl cuff 16. After passing the slicer 15, the spiraled vinyl cuff 17 passes to a cutter 18 at the same constant rate of speed. The cutter 18 then cuts the cuff 1 into sections 19 of the proper, desired length.

Before passing through the slicer 18, an elastic material may be coated with a pesticide holding material, or conversely a pesticide holding material may be coated with an elastic material, and then the combination may be sliced by the slicer and cut into correct lengths by the cutter. It is alternatively the case that the cut sections may be treated after slicing and cutting in order to give the appropriate repellent characteristics.

Figure 6:
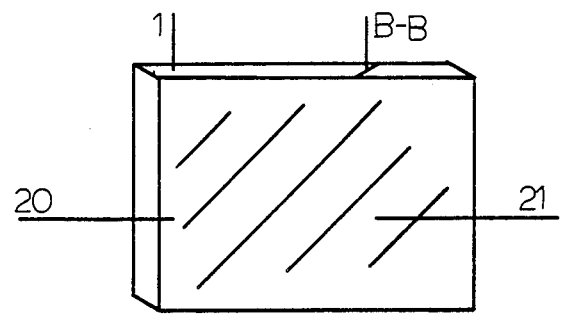
FIG. 6 is a plan view of an alternate embodiment of the invention shown in FIG. 1.

FIG. 6 is a plan view of an alternative embodiment of the invention. In this form a sheet of material 20 is coated on at least one side with an adhesive surface 21.

Figure 7:
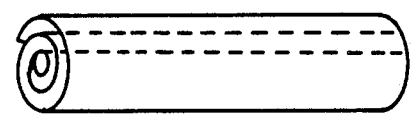
FIG. 7 is a plan view of the embodiment of FIG. 6 showing the embodiment as it will be applied.
Figure 9:
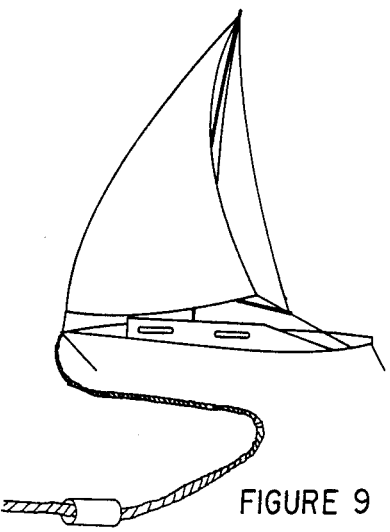
FIG. 9 is an explempary vessel.

In FIG. 6, the adhesive is glue 21 placed along the inner surface. The sheet 20 may be wrapped around the line 3 to be protected. The glue 21 then serves two purposes. First, the glue 21 holds the cuff 1 in place on the rope 3. Secondly, the glue 21 holds the sheet in the shape of the rope 3, as best seen by reference to FIG. 7. Glue may be used in any of the other embodiments in order to hold the device in place without buckles or pins. As can best be seen in FIG. 7 (and noting also FIG. 9), the strip or sheet of material 20 extends a substantially greater distance axially, i.e. longitudinally along the length of the mooring line, compared to radially, being extended a substantial distance along the mooring line, preventing a pest from crossing it due to the longitudinal extent of its insecticidal material rather than its radial extent.

Figure 8:
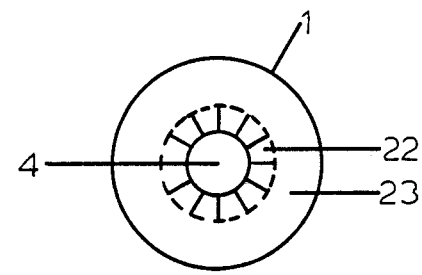
FIG. 8 is an alternate embodiement of FIG. 2.

As can best be seen by reference to FIG. 8, an elastic inner core 22 may be provided wherein a non-elastic surface 23 for retention of insecticide surrounds that elastic core. Alternatively, a porous elastic core 23, which would allows the repulsing characteristics of the pesticide to come to the surface or otherwise act to repel the insects, may surround an insecticide core 22 or material capable of holding an insecticide. In this way, more elastic but less chemical tolerating materials may be used in order to obtain elasticity. Thus, materials which are more susceptible to retention of insecticides may be used, which are otherwise less elastic, and one can still maintain the same form of the preferred embodiment of the cuff 1.

Because many varying and different embodiments may be made within the scope of the inventive concept herein taught and because many modifications may be made in the embodiments herein detailed in accordance with the descriptive requirements of the law, it is to be understood that the details herein are to be interpreted as illustrative and not in a limiting sense.

What is claimed is:

1. A device for preventing insects and other pests from crossing a marine mooring line for a ship, comprising: a cuff wrappable about the mooring line treated to hold a repellent material or a poison, said cuff having a spiral cut, said cuff being openable along the spiral for wrapping around the mooring line.

2. The device of claim 1, wherein the cuff has a cylindrical shape.

3. The device of claim 2, wherein said spiral cut extends over a range of 360 degrees around the longitudinal cylindrical axis of the cuff.

4. The device of claim 1, wherein said cuff is made of an elastic material tending to retain its original shape after being extended.

5. The device of claim 1, wherein, said cuff is equipped with retaining means for retaining the cuff at a given position along the length of the mooring line.

6. The device of claim 5, wherein said retaining means is a pin insertable through said cuff and then through the mooring line.

7. The device of claim 5 wherein said retaining means is a buckle attached to said cuff.

8. A marine pest repellent system, comprising:
   a marine vessel;
   a mooring point to which said vessel in moored;
   mooring connecting means for connecting said vessel to said mooring point; and
   a poison or repellent treated cuff wrapped completely around said connecting means for a significant distance between said vessel and said mooring point, said cuff providing a pest repellent barrier to any pest seeking to move between said mooring vessel and said vessel along said connecting means, said strip of material extending a substantially greater distance axially compared to radially, being extended a substantial distance along said mooring connecting means, preventing a pest from crossing it due to its longitudinal extent rather than its radial extent.

9. The system of claim 8, wherein said cuff forms a spiral encircling said connecting means several times.

10. The system of claim 8, wherein said cuff is of cylindrical shape and of elastic material having a natural diameter less than the diameter of said connecting means, the elasticity of said cuff causing it to tightly grip the exterior surfaces of said connecting means.

* * * * *